US011663833B2

(12) United States Patent
Popov et al.

(10) Patent No.: US 11,663,833 B2
(45) Date of Patent: May 30, 2023

(54) SYSTEMS AND METHODS FOR SENSING THE SURROUNDINGS OF A VEHICLE

(71) Applicant: VAYYAR IMAGING LTD., Yehud (IL)

(72) Inventors: Mark Popov, Ramat Gan (IL); Yuval Lomnitz, Herzeliya (IL); Tanya Chernyakova, Tel Aviv (IL); Ronen Tur, Binyamina (IL); Felix Mester, Holon (IL); Tom Harel, Shefayim (IL); Assaf Kartowsky, Tel Aviv (IL); Orel Ron, Rishon Letsiyon (IL)

( * ) Notice: Subject to any disclaimer, the term of this patent is extended or adjusted under 35 U.S.C. 154(b) by 0 days.

(21) Appl. No.: 17/775,325

(22) PCT Filed: Nov. 9, 2020

(86) PCT No.: PCT/IB2020/060508
§ 371 (c)(1),
(2) Date: May 9, 2022

(87) PCT Pub. No.: WO2021/090285
PCT Pub. Date: May 14, 2021

(65) Prior Publication Data
US 2022/0366701 A1 Nov. 17, 2022

Related U.S. Application Data

(60) Provisional application No. 63/037,021, filed on Jun. 10, 2020, provisional application No. 63/037,026, filed on Jun. 10, 2020, provisional application No. 62/955,487, filed on Dec. 31, 2019, provisional application No. 62/932,511, filed on Nov. 8, 2019.

(51) Int. Cl.
*G06K 9/00* (2022.01)
*G06V 20/58* (2022.01)
*B60W 40/105* (2012.01)

(52) U.S. Cl.
CPC .......... *G06V 20/58* (2022.01); *B60W 40/105* (2013.01); *B60W 2420/52* (2013.01); *B60W 2554/4049* (2020.02)

(58) Field of Classification Search
None
See application file for complete search history.

(56) References Cited

U.S. PATENT DOCUMENTS

| 2,645,769 A | 7/1953 | Roberts |
| 5,764,014 A | 6/1998 | Jakeway et al. |
| 2005/0179582 A1 | 8/2005 | Woodington et al. |

(Continued)

FOREIGN PATENT DOCUMENTS

CN 109997057 A * 7/2019 ........... B60Q 1/0023

*Primary Examiner* — Wei Wen Yang
(74) *Attorney, Agent, or Firm* — Alphapatent Associates, Ltd; Daniel J. Swirsky

(57) ABSTRACT

Systems and methods for sensing the surroundings of vehicles via vehicle mounted radar sensors. A directional transmitter array transmits radiation into the region surrounding the vehicle and a receiver array receives the radiation reflected back. Controllers may use self-velocity calculation modules, wall detection modules, dynamic range enhancement modules, double reflection detection modules and the like to harvest useful information such as the vehicles relative speed and the identification of hazards in its surroundings.

8 Claims, 11 Drawing Sheets

(56) References Cited

U.S. PATENT DOCUMENTS

| | | |
|---|---|---|
| 2005/0285773 A1 | 12/2005 | Hartzstein et al. |
| 2016/0061935 A1 | 3/2016 | McCloskey et al. |
| 2018/0232947 A1* | 8/2018 | Nehmadi ................ G01S 7/295 |
| 2020/0158861 A1* | 5/2020 | Cattle ................... G01S 13/931 |

* cited by examiner

Fig. 3A  Fig. 3B

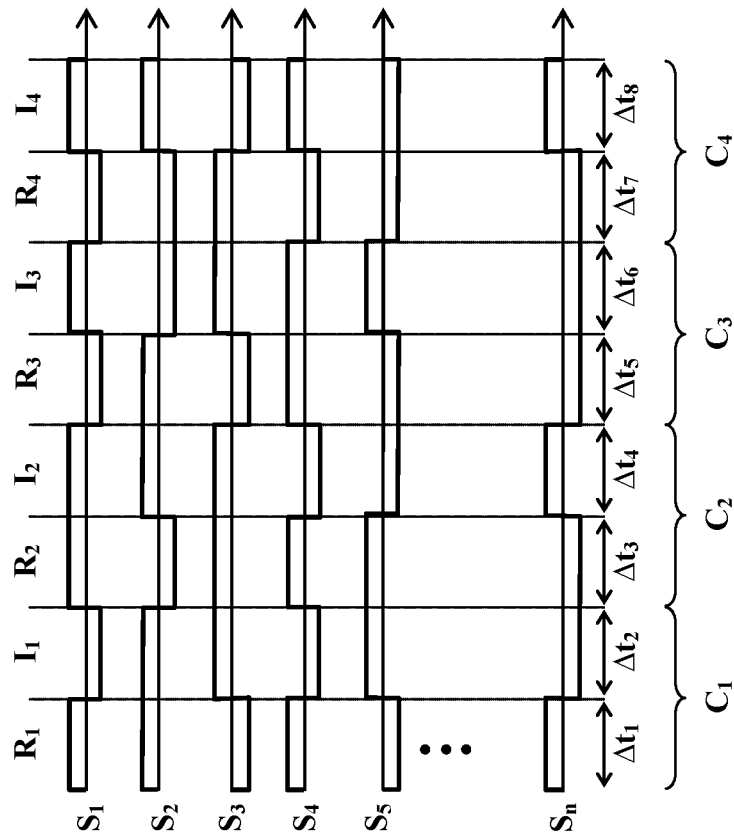
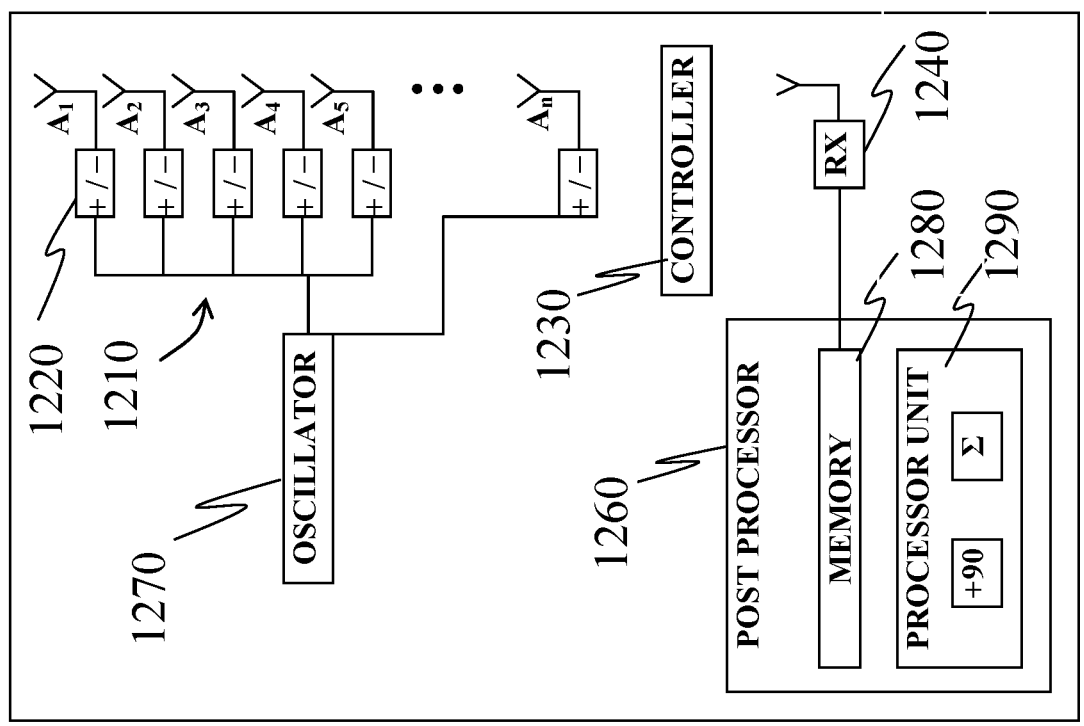
Fig. 7B
Fig. 7A

SYSTEMS AND METHODS FOR SENSING THE SURROUNDINGS OF A VEHICLE

CROSS-REFERENCE TO RELATED APPLICATIONS

This application is a U.S. National Phase Application under 35 U.S.C. 371 of International Application No. PCT/IB2020/060508, which has an international filing date of Nov. 9, 2020, which claims the benefit of priority from U.S. Provisional Patent Application No. 62/932,511, filed Nov. 8, 2019, U.S. Provisional Patent Application No. 62/955,487, filed Dec. 31, 2019, U.S. Provisional Patent Application No. 63/037,021, filed Jun. 10, 2020, and U.S. Provisional Patent Application No. 63/037,026, filed Jun. 10, 2020, the contents of which are incorporated by reference in their entirety.

FIELD OF THE DISCLOSURE

The disclosure herein relates to systems and methods for sensing the surroundings of vehicles. In particular systems and methods are described for providing vehicle mounted radar sensors operable to detect objects in the region surrounding a moving vehicle.

BACKGROUND

Various sensors may be used to sense objects. Indeed with the increased usage of autonomous vehicles such as self-driving cars and the like a plethora of sensors are used to detect objects in the vicinity of travelling vehicles. For example, sensors such as video cameras, ultrasonic sensors, infrared, LIDAR sensors and the like may be used to provide information pertaining to the environment through which the vehicle is travelling.

The application of radar is becoming more and more popular with the development of the RFIC and signal technology. Radar sensors have the advantage of operating in total darkness, fog, mist and rain. Radar is an electronic system with the advantages of low cost, low-power consumption, and high precision. It can be significantly applied in various applications including, space shuttle topographic missions, optics, geotechnical mapping, meteorological detection, and so on. The working efficiency of a radar system is based upon reliable and stable radar signal with wide coverage, high directionality, high gain and low signal-to-noise ratio.

The usefulness of radars as vehicle mounted sensors depends upon their resolution and accuracy of determining direction, range and speed. The directionality achievable by antenna depends on its physical size, relative to the wavelength at the frequency of operation. This is true for both mechanically steered and electronically steered beams. Electronic beam steering involves aligning the phases of signals from/to antenna elements in a given direction. The beam shape of an antenna array depends upon the phase shift applied to each antenna element in the array. Typically each antenna element has an a-priori implementation dependent phase shift related to the transmission lines and amplifiers along the signal path to the antenna element. Where no additional phase shift is applied, the resulting beam typically has no well-defined beam shape, such that the direction from which reflected beams are received is difficult to determine.

A well-known method of achieving highly directional beams is applying phase shift along each path to the corresponding antenna elements, so that the transmissions from different elements combine coherently in a given propagation direction. However, applying arbitrary phase shift incurs implementation complexity, and sometimes there's a need to resort to coarse phase control. Examples of coarse phase control are selecting one of 2 or 4 possible phases, while finer control may allow selecting on of 8 or 16 phase values in each phase-controlled path.

Directionality to a transmitted beam may me achieved through binary phase shift keying (BPSK) based beam forming. This may be achieved by applying a 0-or-180 degree phase shift to the signal transmitted via selected antennas. However, BPSK beamforming carrier a penalty due to the coarse phase quantization and large difference, on the average, between the optimal desired and the actual phase. BPSK beam forming generates, on the average, significant side lobes which may dissipate about 60% of the energy of the transmission. Reduction of sidelobes calls for finer-grain control of the phase, e.g. every 90 degrees rather than 180 degrees. With 90 degree granularity of phase control, only 20% of energy is lost to sidelobes.

By way of example, in the context of imaging, the transmit antennas may be scanned by various code-sequences over several time intervals (for example, switching between antennas over time, or coding the antennas by a Hadamard code, or beamforming toward specific directions). The directional characteristics can be reconstructed by a-posteriori beamforming, combined with inversion of the encoding matrix. Reflection from a moving target may produce phase rotation over those time intervals in a manner detrimental to imaging. The motivation to generate good beamformers arrives from the fact that concentrating energy to a different direction in each time interval reduces the effect of phase rotation. Furthermore, where transmission sweep over a range of frequencies is transmitted over a time period, such as an up-chirp or a down-chirp, the delay between time intervals is increased still further.

As a result it can be very difficult to accurately determine the location of a target.

The need remains, therefore, for effective radar sensors which may be used to accurately sense objects in the region surrounding a travelling vehicle. The invention described herein addresses the above-described needs.

SUMMARY OF THE EMBODIMENTS

According to one aspect of the presently disclosed subject matter, a system is introduced for sensing the surroundings of a vehicle. The system may comprise a vehicle mounted radar unit including a radar transmission unit comprising an array of transmitter antennas connected to an oscillator and configured to transmit electromagnetic waves into a region surrounding the vehicle, and a radar receiving unit comprising at least one receiver antenna configured to receive electromagnetic waves reflected by objects within the region surrounding the vehicle and operable to generate raw data.

The system may further include a processor unit in communication with the radar receiving unit and configured to receive raw data from the radar unit and operable to generate environmental information based upon the received data.

As required, the processor may comprises various additional modules such as: a self-velocity calculation module operable to calculate velocity of the vehicle from raw data; a wall detection module operable to detect planar surfaces in the region surrounding the vehicle; a dynamic-range enhancement module operable to distinguish objects reflecting weakly from objects reflecting strongly within the same vicinity; and a double-reflection identification module operable to distinguish single-reflected electromagnetic waves reflected directly by objects towards the radar receiving unit from double-reflected electromagnetic waves reflected indirectly from objects towards the radar receiving unit via intermediate reflective surfaces.

In some systems, the radar transmission unit further comprises a polarizer configured and operable to generate circularly polarized electromagnetic waves and/or the radar receiving unit further comprises a polarization detector configured and operable to detect the polarization of the received electromagnetic waves. Accordingly, the double-reflection identification module may comprise a circular polarizer and a polarization detector.

Where required, the system includes a self-velocity calculation module comprising an image generation unit and a memory unit. The image generation unit may be configured and operable to construct a constructing a three dimensional image representing the region surrounding the vehicle comprising a matrix of voxels, each voxel characterized by a set of voxel parameters including: a horizontal spatial coordinate, x, of a reflecting object along an axis parallel to the path of the vehicle; a vertical spatial coordinate, y, of the reflecting object along a vertical axis orthogonal to the path of the vehicle; a radial spatial coordinate, R, of the reflecting object along an axis diverging radially from the vehicle; an intensity value; and a Doppler-shift value indicating an apparent radial velocity $v_R$ of the reflecting object. The memory unit may be configured to store data pertaining to at least: a first three dimensional image representing the region surrounding the vehicle at a first instant, and a second three dimensional image representing the region surrounding the vehicle at a second instant after a delay time, dt.

Additionally or alternatively, the system may include a wall detection module comprises a processing unit, and a memory unit storing executable code directed towards comparing energy-profile within a virtual box with a reference energy-profile indicative of a two dimensional reflector.

Accordingly, it is another aspect of the disclosure to teach a method for sensing the surroundings of a vehicle by providing a vehicle mounted radar unit comprising a radar transmission unit comprising an array of transmitter antennas connected to an oscillator, and a radar receiving unit comprising at least one receiver antenna; providing a processor unit in communication with the radar receiving unit; transmitting electromagnetic radiation into the region surrounding the vehicle; receiving electromagnetic radiation reflected from an object in the region surrounding the vehicle; detecting polarization of received electromagnetic waves; detecting two dimensional extended targets within the region surrounding the vehicle; distinguishing objects reflecting weakly from objects reflecting strongly within the same vicinity by applying dynamic-range enhancement filter combinations; constructing a series of three dimensional images of the region surrounding the vehicle; and analyzing the series of three dimensional images to determine the velocity of the vehicle.

Where appropriate, the step of detecting two dimensional extended targets in the region surrounding a vehicle may comprise: detecting a spectral-reflection point in reflected radiation; constructing virtual box around volume containing a candidate wall-object; calculating energy-profile for the radar image within the virtual box; and applying a classification function to the energy-profile.

Additionally or alternatively, the method may include applying a classification function comprises calculating at least one wall-indication parameter selected from a group consisting of: overall energy reflected from within virtual box; profile of reflected energy from within virtual box segments; number of voxels within virtual box having energy values above a threshold value; and combinations thereof.

Where required, the step of constructing a series of three dimensional images comprises: constructing at least a first three dimensional image representing the region surrounding the vehicle at a first instant; waiting for a delay time, dt; and constructing a second three dimensional image representing the region surrounding the vehicle at a second instant.

Accordingly, the step of analyzing the series of three dimensional images to determine the velocity of the vehicle may comprise: detecting common reflecting objects in the first three dimensional image and the second three dimensional image; determining a horizontal shift, dx, for detected common reflecting objects; and calculating a gradient of a plot of apparent radial velocity vR as a function of horizontal shift dx for the reflecting objects. Where appropriate, the step of determining the horizontal shift, dx, comprises: determining an x-coordinate, xn, for the reflecting object; determining a y-coordinate, yn, for the reflecting object; finding the reflecting object's co-altitude angle, θn, by calculating the arctangent of the ratio (xn/yn) of the x-coordinate of the reflecting object and the y-coordinate of the reflecting object an angle; and calculating the sine of the co-altitude angel such that dx=sin(arctan(xn/yn)).

In still another aspect a method is taught for simulating quadrature phase-shift key (QPSK) beam forming in an antenna array, wherein each antenna of the array is connected to a common transmitter via a binary phase shifter. The method may include determining a required complex QPSK steering vector for each transmitting antenna of the array. The steering vector typically has a real component selected from 0 and 180 degrees and an imaginary component selected from 90 and 270 degrees.

Accordingly, the transmitter generates an oscillating signal. During a first time interval, for each transmitting antenna having an associated steering vector with a real component of 180 degrees, said binary phase shifter a 180 degree phase shift to the transmitted signal is applied. During a second time interval, for each transmitting antenna having an associated steering vector with an imaginary component of 180 degrees, said binary phase shifter a 180 degree phase shift to the transmitted signal is applied. A post processor may be used to apply a 90 degree phase shift to signals received during the second time interval, and the post processor may sum the signals received during the first time interval to 90 degree phase shifted signals received during the second time interval. Optionally the transmitter may sweep the oscillating signal over a range of frequencies during each time interval.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIGS. 3A-D schematically represent a radar unit of the disclosure mounted to a moving vehicle detecting apparent movement of objects in the region surrounding the vehicle;

FIG. 7A is a block diagram schematically representing selected elements of a first embodiment of a system for simulating quadrature phase-shift keying (QPSK) beam forming;

FIG. 7B are a set of graphs indicating a possible set of profiles showing an example of how the phase of the transmitted signal from each transmitter antenna of the first embodiment may change over time;

DETAILED DESCRIPTION

Figure 1A:
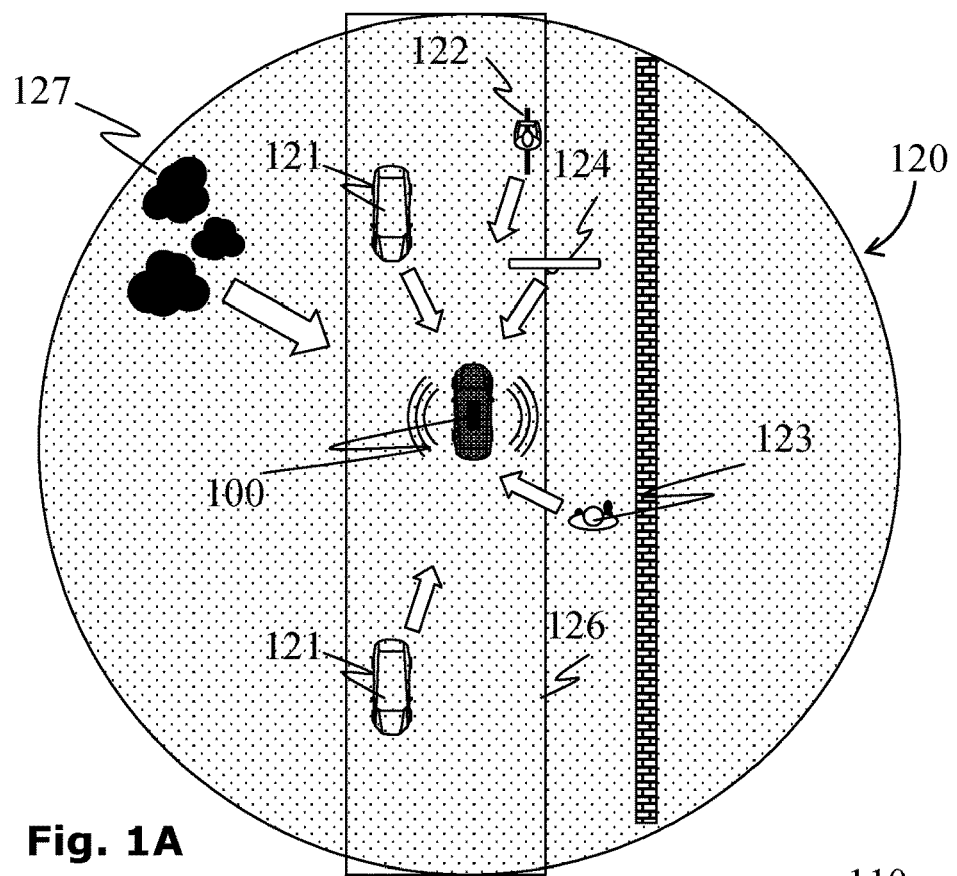
FIG. 1A schematically represents a vehicle mounted radar unit configured to sense objects in the region surrounding a vehicle.

Aspects of the present disclosure relate to systems and methods for sensing the surroundings of vehicles. In particular systems and methods are described for providing vehicle mounted radar sensors operable to detect objects in the region surrounding a moving vehicle. Furthermore directional radar arrays are described having wide fields of view.

Vehicle mounted radar units are presented herein which are operable to sense objects surrounding vehicle to which they are mounted. The radar unit may be used to harvest information regarding the environment through which it is moving. This disclosure teaches various techniques that a radar unit may analyze data received such that useful information may be gathered such as the vehicles relative speed and the identification of hazards in its surroundings.

A radar unit with sufficient directionality may be provided by reducing side lobes. In order to reduce side lobes, signals transmitted by each antenna of an array may be binary phase shifted according to a required temporal phase shift profile. Post processing methods may be applied to the received reflected signal over multiple time periods to simulate multiple phase shift beam forming such as quadrature phase-shift keying (QPSK) beam forming, for example. Typically, the receivers and transmitters may be synchronized in order to produce consistent results during the time interval on which the signals are combined.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

Reference is now made to FIG. 1A which schematically represents an example of a vehicle mounted radar unit 100 configured to sense objects in the region 120 surrounding a vehicle to which it is mounted. The radar unit 100 may be mounted to various vehicles as required such as road vehicles such cars, trucks, bikes, trailers, caravans and the like, work vehicles such as diggers, cranes, and the like as well aircraft and watercraft where appropriate.

By way of example, the radar unit 100 may be mounted to a car and used to detect various objects in its vicinity such as other cars 121, bicycles 122, pedestrians 123, road signs 124, walls 125, kirbs 126, trees 127 and the like.

Accordingly, the radar unit 100 may be used to harvest information regarding the environment through which the vehicle is travelling. This disclosure teaches various techniques that a radar unit may analyze data received such that useful information may be gathered such as the vehicles relative speed and the identification of hazards in its surroundings.

Figure 1B:
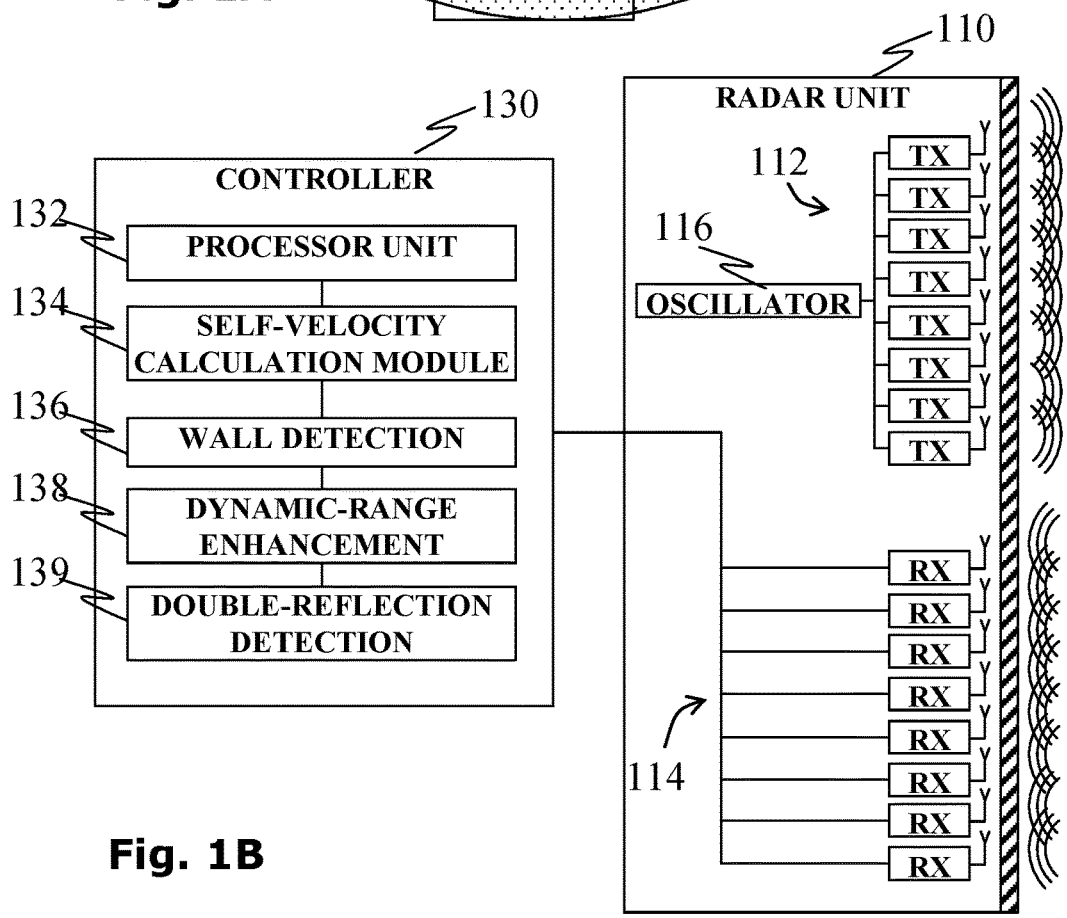
FIG. 1B is a block diagram indicating selected elements of a possible system for sensing the surroundings of a vehicle.

Referring now to the block diagram of FIG. 1B selected elements are presented of a possible radar system for sensing the surroundings of a vehicle. The system includes a radar unit 110 and a controller 130. The radar unit 110 may include a radar transmission unit 112 and a radar receiving unit 114.

The radar transmission unit 112 includes an array of transmitter antennas TX connected to an oscillator 116 and configured to transmit electromagnetic waves into a region surrounding the vehicle. The radar receiving unit 114 includes at least one receiver antenna RX configured to receive electromagnetic waves reflected by objects within the region surrounding the vehicle 120 and may be operable to generate raw data.

The controller 130 may include various modules such as processor units 132, self-velocity calculation modules 134, wall detection modules 136, dynamic range enhancement modules 138, double reflection detection modules 139 and the like.

A processor unit 132 may be in communication with the radar receiving unit 114 so as to receive raw data from the radar unit 114 and generate environmental information based upon the received data. For example, a self-velocity calculation module 134 may be provided to calculate velocity of the vehicle from raw data, a wall detection module 136 may be provided to detect planar surfaces in the region surrounding the vehicle, a dynamic-range enhancement module 138 may be provided to distinguish objects reflecting weakly such as pedestrians 123 from objects reflecting strongly such as a wall 125 or a kirb 126 within the same vicinity.

A double-reflection identification module 139 may be provided so as to distinguish single-reflected electromagnetic waves reflected directly by objects towards the radar receiving unit 114 from double-reflected electromagnetic waves reflected indirectly from objects towards the radar receiving unit 114 via intermediate reflective surfaces. For example, the radar transmission unit 112 may include a circular polarizer configured and operable to generate circularly polarized electromagnetic waves such as described in the applicants co-pending U.S. Patent Publication Ser. No. 16/802,610 which is incorporate herein in its entirety. Accordingly, the radar receiving unit 114 may include a polarization detector configured and operable to detect the polarization of the received electromagnetic waves.

Circular polarized electromagnetic waves reverse their polarity upon reflection such that waves reflecting an even number of times may be readily distinguished from waves reflecting an odd number of times. If the polarization of the received waves matches the polarization of the transmitted waves then they may be considered to have been received directly from a reflecting object. If the polarization of the received waves is reversed, the waves may be considered to have been received indirectly via secondary reflectors.

Figure 2A:
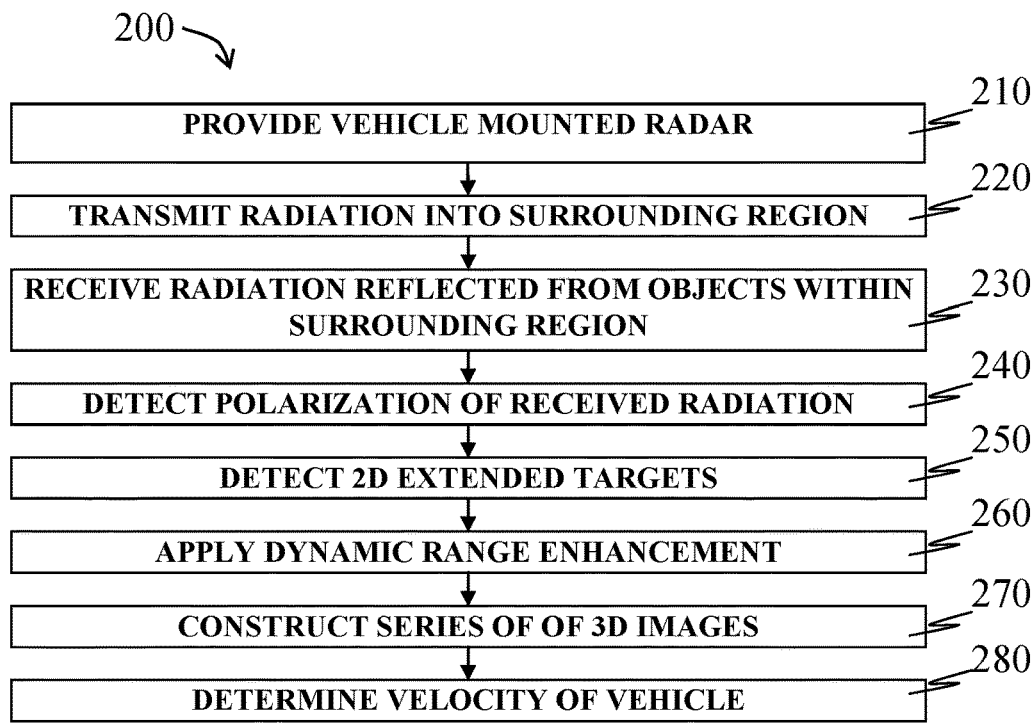
FIGS. 2A-C are flowcharts indicating selected steps in possible methods for sensing the surroundings of a vehicle.

Reference is now made to the flowchart of FIG. 2A which indicates selected steps in a possible method for sensing the surroundings of a vehicle 200. The method may include any or all of the following steps providing a vehicle mounted radar unit comprising a radar transmission unit comprising an array of transmitter antennas connected to an oscillator, and a radar receiving unit comprising at least one receiver antenna, and a processor unit in communication with the radar receiving unit 210; transmitting electromagnetic radiation into the region surrounding the vehicle 220; receiving electromagnetic radiation reflected from an object in the region surrounding the vehicle 230; detecting polarization of received electromagnetic waves 240; detecting two dimensional extended targets within the region surrounding the vehicle 250; distinguishing objects reflecting weakly from objects reflecting strongly within the same vicinity possibly by applying dynamic-range enhancement filter combinations 260; constructing a series of three dimensional images of the region surrounding the vehicle 270; and analyzing the series of three dimensional images to determine the velocity of the vehicle 280.

It is noted that the abovedescribed steps of the method for sensing the surroundings of a vehicle 200 may be carried out in various combinations and various orders as suit requirements. Where necessary, those skilled in the art may include still further steps.

Figure 2B:
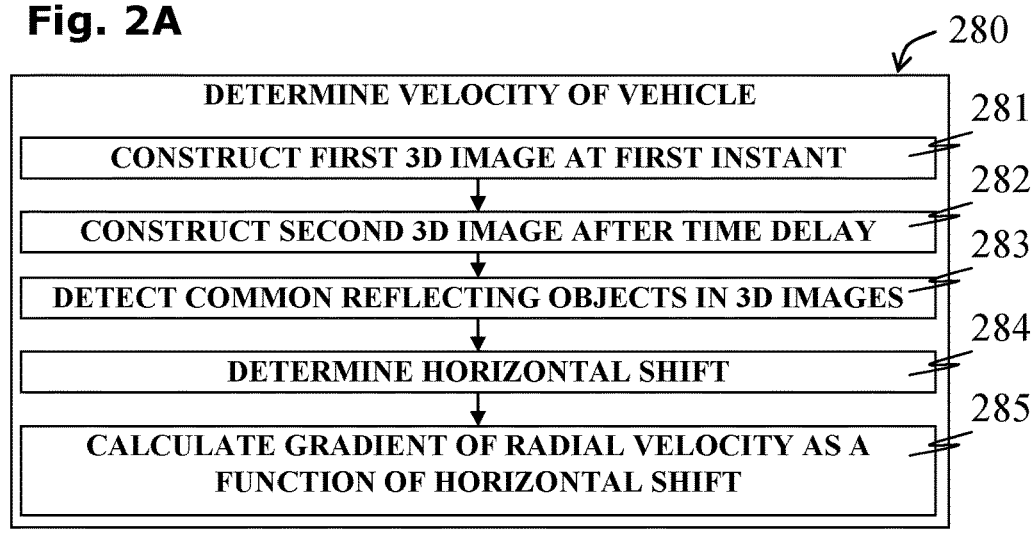
Figure 2C:
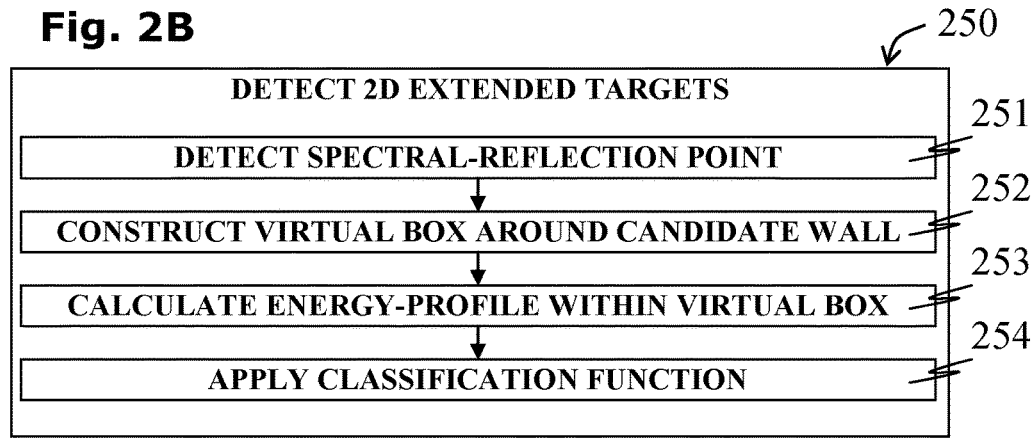

FIGS. 2B and 2C present the substeps of possible methods for carrying out the steps of the steps of constructing a series of three dimensional images 280 and detecting two dimensional extended targets in the region surrounding a vehicle 250.

Referring now to the flowchart of FIG. 2B the substeps of a possible method are detailed for carrying out the step of constructing a series of three dimensional images 280. The substeps include constructing at least a first three dimensional image representing the region surrounding the vehicle at a first instant 281; waiting for a delay time, dt and constructing a second three dimensional image representing the region surrounding the vehicle at a second instant 282; detecting common reflecting objects in the first three dimensional image and the second three dimensional image 283; determining a horizontal shift, dx, for detected common reflecting objects 284; and calculating a gradient of a trendline through a plot of apparent radial velocity $v_R$ as a function of horizontal shift dx for the reflecting objects 285.

Accordingly the self-velocity calculation module may include an image generation unit, and a memory unit. The the image generation unit is configured and operable to construct three dimensional images representing the region surrounding the vehicle, and the memory unit is configured and operable to store data pertaining to a series including at least a first three dimensional image representing the region surrounding the vehicle at a first instant, and a second three dimensional image representing the region surrounding the vehicle at a second instant after a delay time, dt.

So as to better illustrate the method of self-velocity determination reference is now made to FIGS. 3A-D which schematically represent a radar unit of the disclosure 300 mounted to a moving vehicle 310 detecting apparent movement of objects 322, 324 in the region surrounding the vehicle 310.

As illustrated in FIGS. 3A and FIG. 3B showing a side view and a top view of a vehicle, the position 320 of a reflecting object may be defined by at least a horizontal spatial coordinate, x, a vertical spatial coordinate, y, and a radial spatial coordinate, R.

Accordingly, a three dimensional image may constructed of the region surrounding the vehicle by constructing a matrix of voxels, each voxel characterized by a set of voxel parameters including: a horizontal spatial coordinate, x, of a reflecting object along an axis parallel to the path of the vehicle; a vertical spatial coordinate, y, of the reflecting object along a vertical axis orthogonal to the path of the vehicle; a radial spatial coordinate, R, of the reflecting object along an axis diverging radially from the vehicle. Each voxel may further be associated with an intensity value indicating the energy of radiation reflected therefrom, and a Doppler-shift value which may indicate the apparent radial velocity $v_R$ of any reflecting object located at those coordinates in the region around the vehicle. It is noted that even stationary objects will typically have an apparent radial velocity when detected by a sensor mounted to moving vehicle.

The corresponding three dimensional images may include clusters or shapes of high intensity voxels which are characteristic of reflecting objects in the region surrounding the vehicle. Accordingly, an x-coordinate, $x_n$, and a y-coordinate, $y_n$, may be determined for each reflecting object in each three dimensional image.

As a series of such three dimensional is generated, and each three dimensional image is stored in a local memory unit, common reflecting objects may be identified at different coordinates in two or more three dimensional images. Accordingly a horizontal shift dx between a pair of three dimensional images may be defined by finding the reflecting object's co-altitude angle, $\theta_n$, by calculating the arctangent of the ratio $(x_n/y_n)$ of the x-coordinate of the reflecting object and the y-coordinate of the reflecting object an angle; and calculating the sine of the co-altitude angle such that dx=sin (arctan($x_n/y_n$)).

Thus the horizontal shift is defined as $$dx \stackrel{def}{=} \sin \operatorname{atan}\left(\frac{x}{y}\right)$$

Figure 3C:
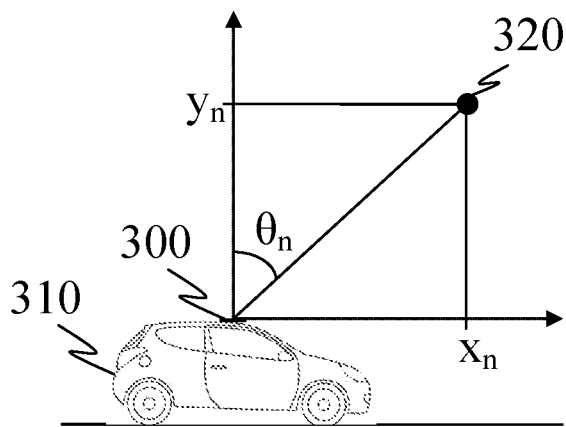
Figure 3C:
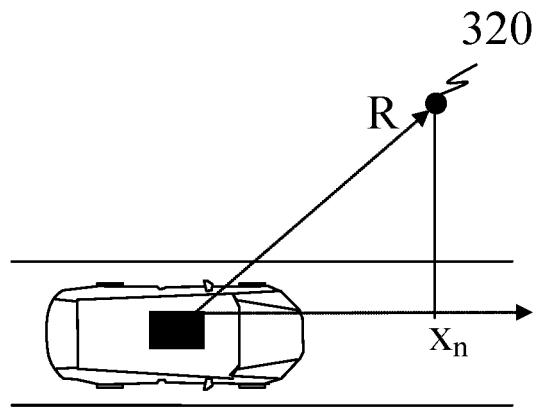
Figure 3C:
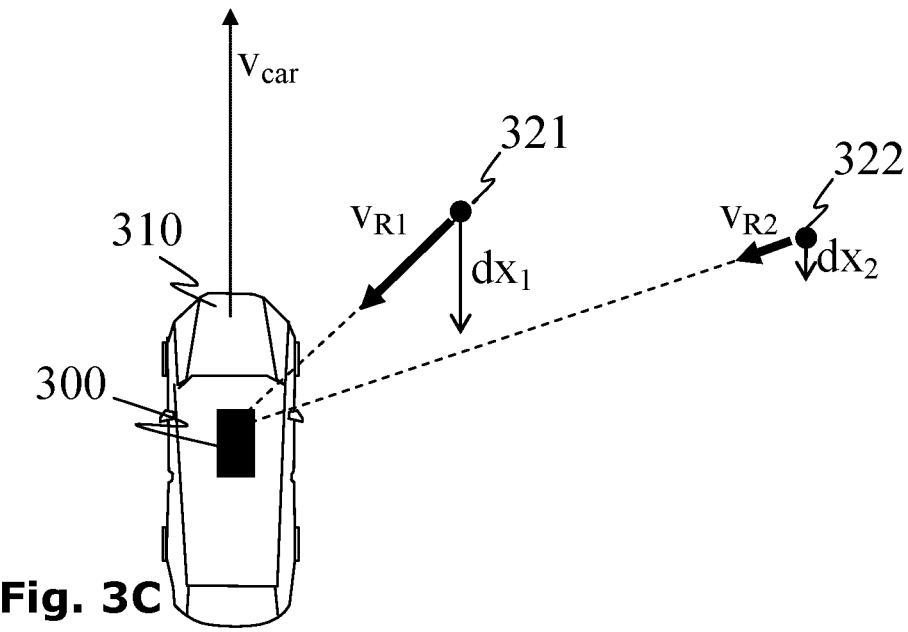
Figure 3D:
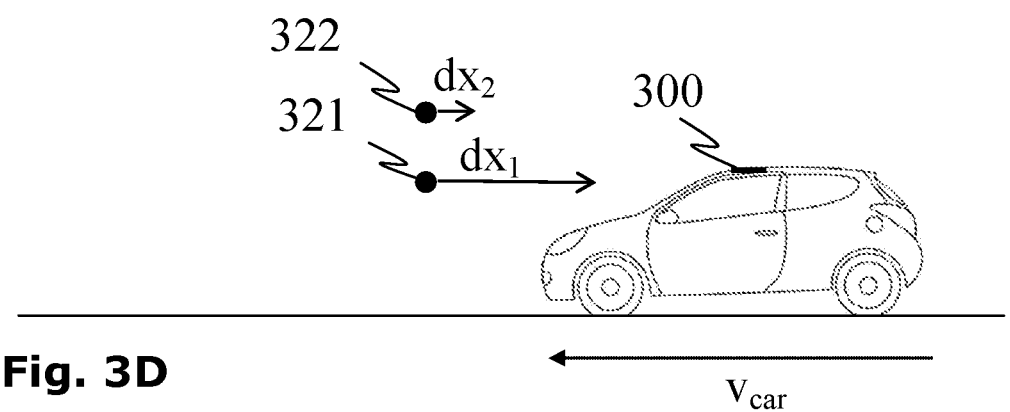

As illustrated in FIGS. 3C and 3D a stationary reflecting object situated at a point 321 relatively close to the radar unit 300 will typically have a large horizontal shift $dx_1$ whereas a stationary reflecting object situated at a point 322 relatively further from the radar unit 300 will typically have a larger horizontal shift $dx_2$. It is further noted that each reflecting object is further characterized by its apparent radial speed $v_{R1}$, $v_{R2}$.

It can be shown that for each stationary reflecting object the apparent radial speed relates to the horizontal shift according to the function $v_R=v_{car}\cdot dx$. Accordingly, when a graph is plotted representing the radial speed values of all detected objects against their corresponding horizontal shifts, a trend line may be constructed, for example using the method of least squares and the gradient of the resulting trendline may indicate the velocity of the vehicle $v_{car}$.

Figure 4A:
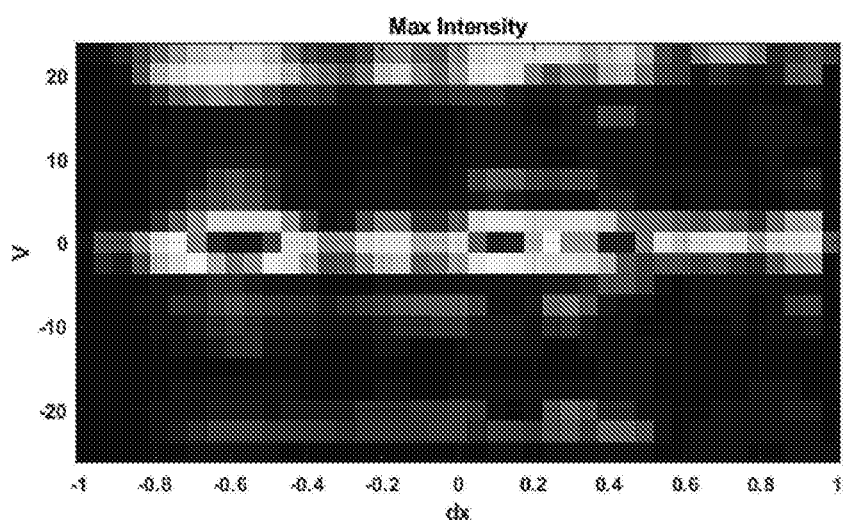
FIGS. 4A-C are three examples of plots of apparent radial velocity $v_R$ as a function of horizontal shift dx for the reflecting objects as measured by radar units mounted to vehicles travelling at different speeds.
Figure 4B:
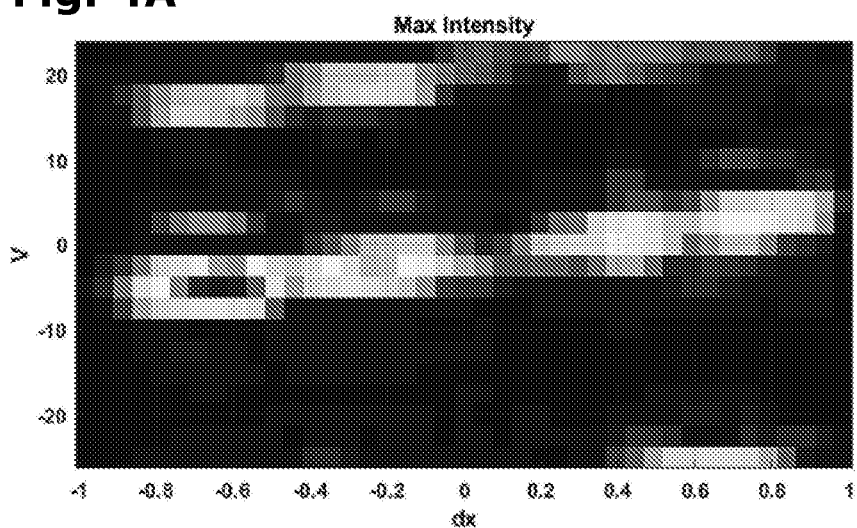
Figure 4C:
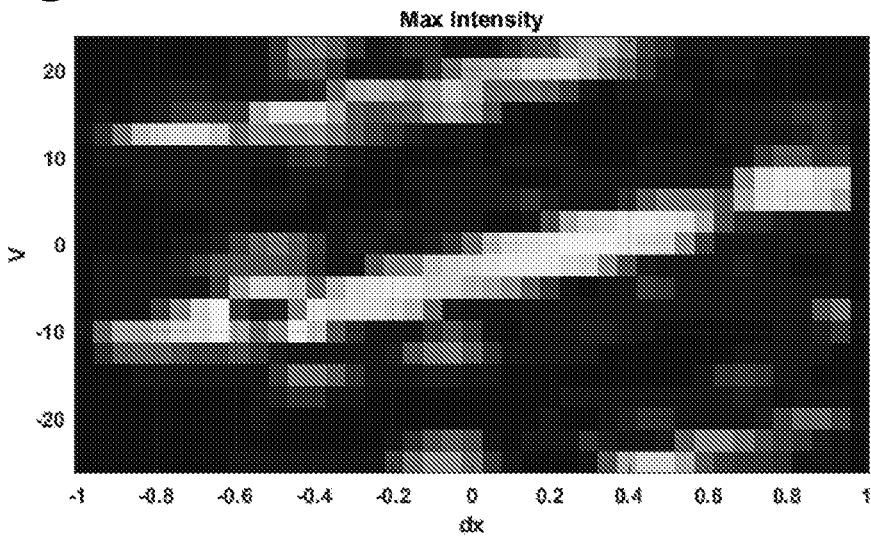

By way of illustration, FIGS. 4A-C are three examples of such plots of apparent radial velocity $v_R$ as a function of horizontal shift dx for the reflecting objects as measured by radar units mounted to vehicles travelling at different speeds. FIG. 4A represents the plot of radial speed against horizontal shift as recorded by a stationary vehicle. The gradient of the resulting line is flat indicating no movement of the vehicle.

FIG. 4B represents the plot of radial speed against horizontal shift as recorded by a vehicle travelling at 20 kph and FIG. 4C represents the plot of radial speed against horizontal shift as recorded by a vehicle travelling at 40 kph. It is noted that as the speed of the vehicle $v_{car}$ increases, so the gradient of the trend line increases in proportion.

Referring back now to the flowchart of FIG. 2C the substeps of a possible method are detailed for carrying out the step of detecting two dimensional extended targets in the region surrounding a vehicle 250. The substeps include detecting a spectral-reflection point in reflected radiation 251; constructing virtual box around volume containing a candidate wall-object 252; calculating energy-profile for the radar image within the virtual box 253; and applying a classification function to the energy-profile 254. By way of example, the classification function may involve calculating at least one wall-indication parameter selected from a group consisting of: overall energy reflected from within virtual box; profile of reflected energy from within virtual box segments; number of voxels within virtual box having energy values above a threshold value; and combinations thereof.

It is noted that whilst it is of importance for vehicle to be able detect prolonged objects such as walls and the like within their surroundings, radar-based far-field sensors may encounter a problem when representing the dimensions of such extended or complex shapes.

By way of example, signals reflected from an extended wall may consist of a dominant reflection from a single specular point, and much weaker diffraction and "diffusive" reflections which may be harder to detect. Nevertheless, the ability to estimate the dimensions of the detected objects can be crucial for various radar-applications, and especially in automotive-radars applications—where the edges of an elongated obstacle may pertain to the determination and maintenance of a safe driving route.

Accordingly, systems of the system described herein may include a wall detection module operable to detect planar surfaces in the region of the vehicle by applying a method for detecting and classifying elongated two-dimensional obstacles such as walls, fences, curbs and the like. The module may further be operable to differentiate such obstacles from single localized objects such as pedestrians, poles, road-signs and the like. In particular, the wall detection module may include a processing unit, and a memory unit storing executable code directed towards comparing energy-profile within a virtual box with a reference energy-profile indicative of a two dimensional reflector.

Methods may include the detection of the strongest reflection from an object and estimation of the object's dimensions from the radar-image energy profile along the object. The strongest reflection will be detected from the object's specular-reflection point.

Figure 5:
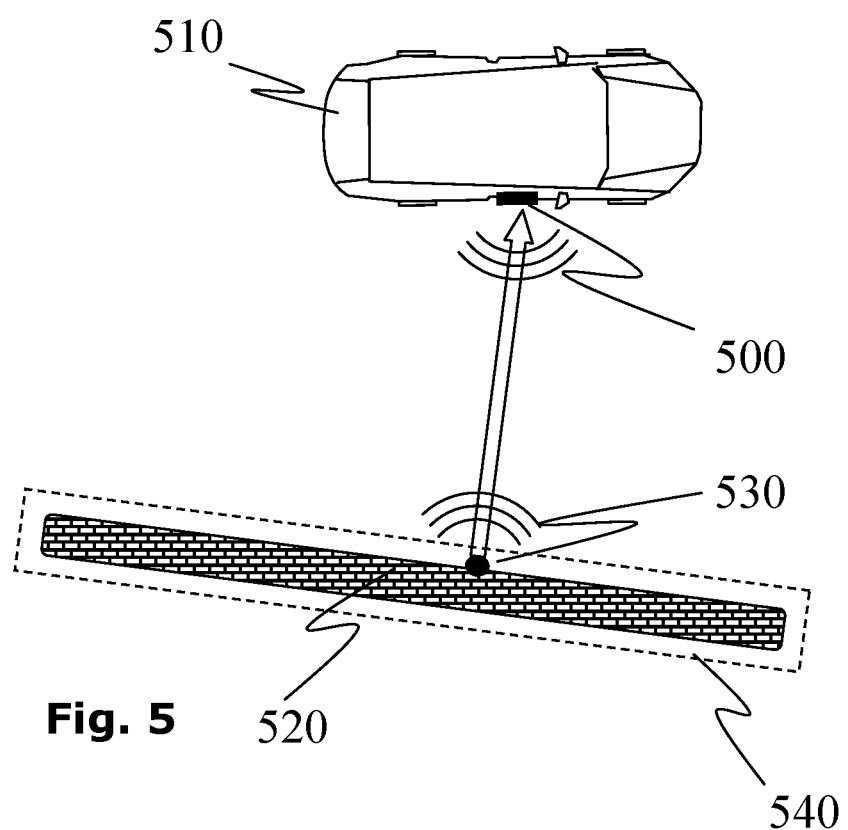
FIG. 5 schematically represents a radar unit of the disclosure mounted to a moving vehicle detecting a wall-type two dimensional extended target in the region surrounding the vehicle.

Referring now to FIG. 5 a radar unit 500 of the disclosure mounted to a moving vehicle 510 may detect a wall-type two dimensional extended target 520 in the region surrounding the vehicle by identifying a specular—point 530. It is particularly noted that for two dimensional objects, the specular-reflection point is typically tangential to the specular-point 530 and perpendicular to the normal between the sensor and the specular point. For millimeter wave range radars, multiple weak reflections are expected from along the extended surface of the two dimensional object. Accordingly, a virtual box 540 may be constructed to contain the expected volume of the wall and the energy-profile of the radar-image within the virtual box may be calculated.

Having calculated an energy-profile for the radar-image within the virtual box, a classification function may be applied to determine likelihood of the object being a wall-object. For example, the classification function may calculate and combine various wall-indication parameters such as: overall energy integrated for all reflections within the volume contained with the virtual box volume, energy integrated for all reflections within segments within the virtual box, the number of voxels within the box which pass certain threshold-value, or the use of voxel clustering within the box such as K-means, DBSCAN or the like. Various classification-methods can be applied on the extracted features, such as hard-threshold, SVM, NN\CNN etc.

It is noted that the dimensions of the candidate wall-object may be evaluated by a variety of methods such as, the following examples. A root mean square value may be calculated for the energy distribution within the box, possibly excluding the specular-reflection itself. Additionally or alternatively the continuity of voxels passing a certain threshold value may be determined. Still further, the dimensions of a main cluster may be determined after applying clustering algorithm on the voxels within the box.

Where appropriate, for example where a wide field of view is provided along a horizontal axis, the velocity-profile of reflections along an elongated target may be determined using self-velocity determination techniques such as described herein. Accordingly, it may be possible to increase the reliability of wall-object detection by referring to the history and the relative velocity of the specular reflection with respect to the sensor. For example, a constant zero relative velocity of a strong reflection detected by a moving sensor might indicate the presence of an elongated object parallel to the motion of the vehicle.

It is further noted that different objects may reflect electromagnetic radiation at different intensities. Thus there is a danger of more weakly reflecting objects may become obscured by more dominant reflections from objects reflecting strongly in the same vicinity. For example, parked vehicles may reflect more strongly than pedestrians, plastic piping may reflect more weakly than a structural-wall from which it is protruded, in such cases the weaker reflection may be difficult to distinguish from the stronger reflection.

Accordingly, systems described herein may include a dynamic range enhancement module configured and operable to distinguish objects reflecting weakly from objects reflecting strongly within the same vicinity.

One method of enhancing weak targets may be by applying a dedicated filter to match the expected properties of a certain target. However, this may come at the expense of other targets of interest, possibly attenuating and degrading their detectability.

It has surprisingly been found that the dynamic-range may be enhanced by combining several filters over the same image. For example an unfiltered image may be merged with a filtered image to enhance weak reflections.

According to one possible combination, a finite impulse response (FIR) filtering or infinite impulse response (IIR) filtering may be merged with a radar-image without temporal-filter over multiple frames. Such a combination may be useful for enhancing weak but dynamic objects. Such dynamic objects include pedestrians, bicycles or other vehicles whose movement may be inherent. Other dynamic objects may be stationary objects whose apparent movement is induced by the moving vehicle-mounted detector, for example a thin and localized object such as a plastic pipe against an extended surface such as a semi-static wall which may appear to be stationary relative to the vehicle.

According to another possible enhancement technique, various high-pass filters or band-pass filters may be applied over multiple frames such that several images are generated, each one expected to correspond to a different time scale.

Still another enhancement technique may include Doppler-domain filtering. Where Doppler-resolution is possible, the expected Doppler histogram associated with the movement of large-static objects may be removed over their predicted volumes. This may leave a micro-Doppler signature of the weaker but more dynamic targets (e.g. pedestrians).

Accordingly, a multi-layer image may be introduced comprising multiple layers each layer corresponding to a different filter. Thus the layers may combined in various combinations. It is further noted that where required feature extraction may be performed for each layer separately such as by generating a point-cloud image and detecting features therein such as described in the applicants U.S. Provisional Patent Application No. 62/955,482 which is incorporated herein by reference in its entirety. Additionally or alternatively, where preferred, a common feature extraction procedure may be performed upon multiple layers simultaneously. Similarly, data from one layer may be used to support data-processing from other layers as required, for example for target-detection reinforcement.

Figure 6A:
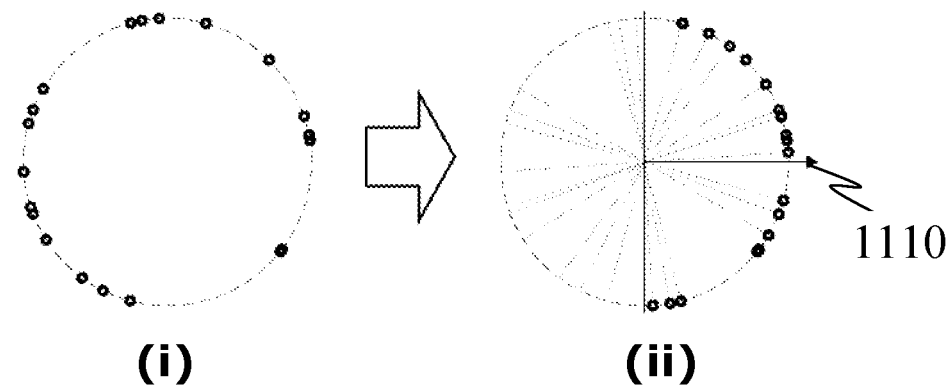
FIG. 6A illustrates how a steering vector may be generated by BPSK phase shifting of the phase of selected antennas by 0 or 180 degrees.
Figure 6B:
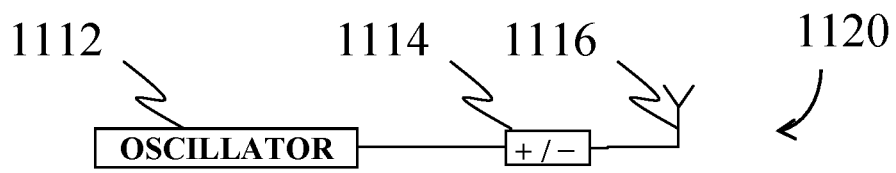
FIG. 6B illustrates a possible BPSK mechanism for phase shifting the signal to an antenna by 180 degrees.

Reference is now made to FIG. 6A and FIG. 6B. FIG. 1A shows how a steering vector may be generated by BPSK phase shifting. With no artificial phase shifting, an array of antennas may produce a range of phase shifts due to the nature of the electronic circuits and the like, plus the phases generated by wave propagation to a desired steering direction (termed "array factor"). This range of phases is represented in the circular range of FIG. 6A(i). The phasors shown in the figure do not add up coherently. By selectively adding a 180 degree phase shift to all the antennas producing phases within the left side of the circle, it is possible to partially align these phasors as shown in FIG. 6A(ii), and thus emit energy toward the desired steering direction. Accordingly, each antenna 1116 of the array may be connected to the signal generating oscillator 1112 via a binary phase shifter 1114, as shown in FIG. 6B. Although the BPSK mechanism may indeed generate a steering vector 1110, the resultant beam suffers significant side lobes and large losses.

Figure 6C:
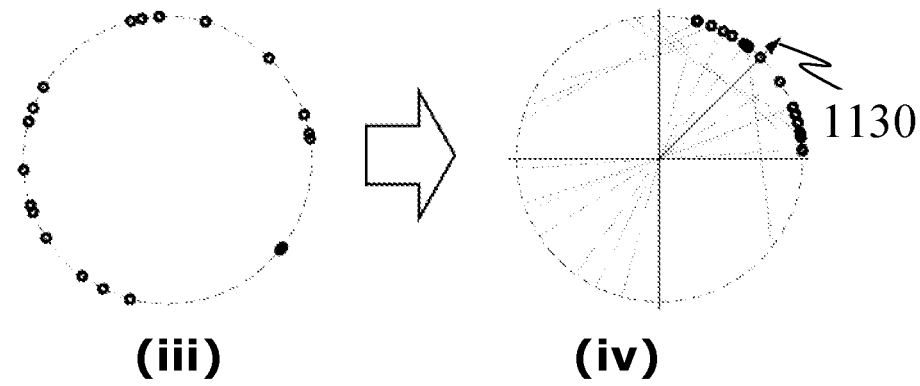
FIG. 6C illustrates how a steering vector may be generated by QPSK phase shifting of the phase of selected antennas by 0, 90, 180 or 270 degrees.
Figure 6D:
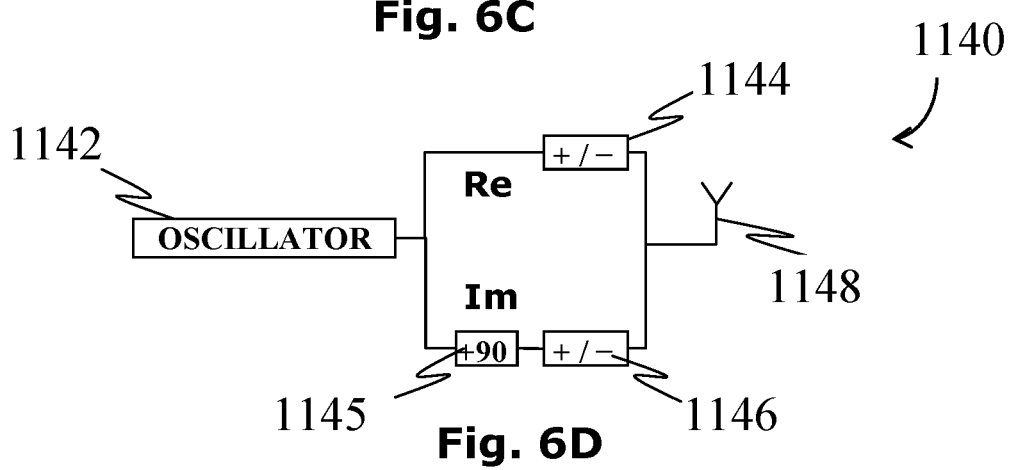
FIG. 6D illustrates a possible quadrature modulation mechanism for phase shifting the signal to an antenna by 0, 90, 180 or 270 degrees.

A more efficient steering vector may be generated by providing further phase shift options. Referring to FIGS. 6C and 6D, a range of phases such as shown in FIG. 6C(iii) may be converted into a net steering vector 1130 such as shown in FIG. 1C(iv) by selectively shifting each transmitted signal by 0, 90, 180 or 270 degrees as required (QPSK).

FIG. 6D illustrates a possible hardware arrangement 1140 for producing such phase shifts in an antenna 1148 of the array. Each antenna 1148 of the array may be connected to the signal generating oscillator 1142 via a phase shifting mechanism having two parallel arms an in-phase arm (Re), and a quadrature arm (Im).

The in-phase arm (Re) includes a first binary phase shifter 1144 which may be selectively activated to add a 180 degree phase shift to the oscillating signal as required. Alternatively, by not activating the first binary phase shifter the signal is transferred to the transmitting antenna in phase.

The quadrature arm (Im) includes a second binary phase shifter 1146 and a quarter cycle phase shifter 1145. The quarter cycle phase shifter 1145 is configured to add a 90 degree phase shift to the oscillating signal. Accordingly, if the second binary phase shifter 1146 is not activated a 90 degree phase shift is applied to the signal transferred to the antenna. Alternatively, if the second binary phase shifter is activated to add a further 180 degree phase shift, a total phase shift of 270 degree is applied to the signal transferred to the antenna as required.

It will be appreciated that such a hardware quadrature modulation mechanism such as shown in FIG. 6D may significantly improve the overall steering vector. However, the arrangement requires significantly more hardware elements than the simple binary phase shifter 1120 of FIG. 6B. The addition of a quadrature arm for each antenna, including a quarter cycle phase shifter which may need to be located physically close to the antenna itself, places significant hardware constraints on the architects of antenna array circuits.

A possible solution for generating improved steering vectors using only the binary phase shifter elements is described here.

Referring now to the block diagram of FIG. 7A, selected elements are represented of a first embodiment of a system for simulating quadrature phase-shift keying (QPSK) beam forming in an antenna array 1200. The system includes a transmitter 1250, an antenna array 1210, a binary phase shifter 1220 associated with each transmitting antenna, a controller 1230, a receiving antenna 1240; and a post processor 1260.

The transmitter 1250 is configured and operable to generate an oscillating signal for transmission by the antenna array 1210. It is noted, that where appropriate, the transmitter 1250 may be further operable to generate a signal sweeping through a range of frequencies, or a chirp.

The antenna array 1210 includes a number of antennas A1-$n$. Each antenna is operable to transmit the signal generated by the oscillator 1270 simultaneously with a required phase shift. It will be noted that the superposition of the transmitted signals from all the antennas in the array produces an overall signal beam having a characteristic shape.

The binary phase shifter 1220 associated with each transmitting antenna An is configured and operable to selectively apply a phase shift of 180 degrees to the oscillating signal as required. Alternatively, if the binary phase shifter 1220 is not activated, no phase shift is applied to the oscillating signal. Accordingly, the signal transmitted by the associated antenna is either in phase or in anti-phase with the oscillating signal produced by the oscillator 1270, as required.

The controller 1230 is configured to send activation instructions to the binary phase shifters 1220 such that only the required antennas transmit phase shifted signals.

The (one or more) receiving antenna 1240 is configured to receive return signals reflected from targets.

The post processor 1260 is operable to manipulate received signals and includes a memory 1280 element and a processing unit 1290. The memory element 1280 is operable to save received signals. The processing unit is operable to apply phase shifts to selected received signals stored in the memory 1280, and further operable to sum received signals stored in the memory 1280.

In particular examples, the processing unit may apply a 90 degree phase shift to selected received signals and to sum these with other received signals to produce a required output signal.

Accordingly, the controller may be operable to determine a required complex steering vector C=R+jI for each antenna of the array. The complex steering vector C includes a binary real component R selected from +1 and −1 and a binary imaginary component I selected from +1 and −1. The value of +1 indicates that no phase shift is required and the component of −1 indicates that a phase shift is required. Thus the real component may represent a required phase shift selected from 0 and 180 degrees and an imaginary the component may represent a required phase shift selected from 90 and 270 degrees, all with reference to the R=+1, I=+1 combination.

Referring now to the graphs of FIG. 7B which indicate a possible set of profiles showing an example of how the phase of the transmitted signal S1-$n$ from each transmitter antenna A1-$n$ of the first embodiment may change over time.

It is noted that the phase shift of each antenna remains fixed for a given time interval Δt. Each antenna An receives a unique profile determined by the required steering vector Ci at that time. Each complex steering vector Ci may determine the required phase shifts for two consecutive time intervals Δti, Δti+1.

During a first time interval Δti, the controller instructs binary phase shifters 1220 of antennas A1-$n$ having an associated steering vector Ci with a real component Ri of −1 to apply a 180 degree phase shift to the transmitted signal.

During a second time interval Δti+1, the controller instructs binary phase shifters 1220 of antennas having an associated steering vector Ci with an imaginary I component of −1 to apply a 180 degree phase shift to the transmitted signal.

Accordingly, the post processor 1260 may be operable to store reflected signals received during the first time interval and the second time interval in the memory. The processor unit may then apply a 90 degree phase shift to signals received during the second time interval before summing the signals received during the first time interval to 90 degree phase shifted signals received during the second time interval.

The resulting output signal from the post processor will have the characteristics of a quadrature phase shifted signal.

Figure 7C:
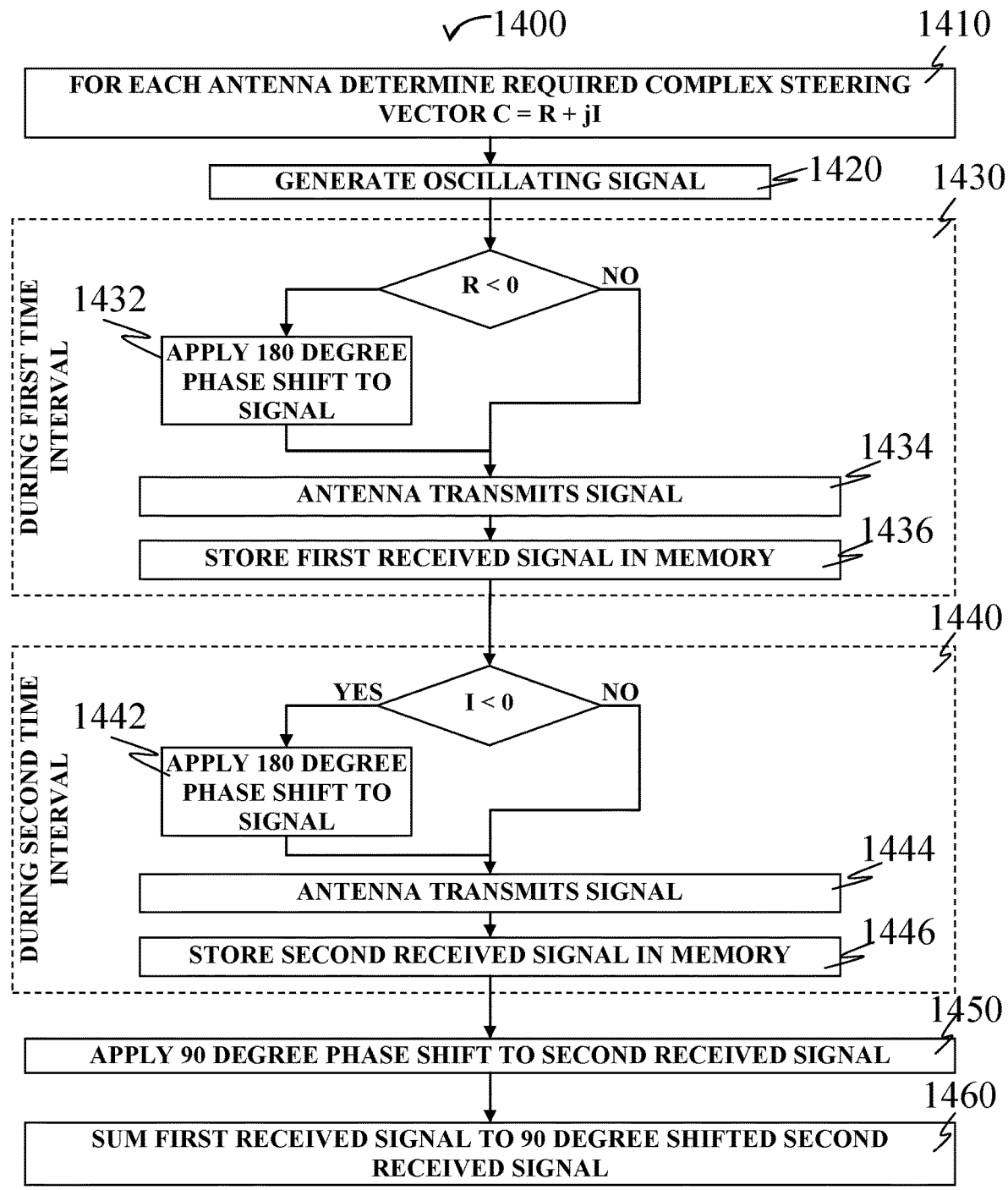
FIG. 7C is a flowchart indicating selected steps in a method for simulating quadrature phase-shift keying (QPSK) beam forming with the system of the first embodiment.

Referring now to the flowchart of FIG. 7C, selected steps are indicated of a method 1400 for simulating quadrature phase-shift keying (QPSK) beam forming with the system of FIG. 7A in which the antennas of the array 1210 are each connected to a common transmitter via a binary phase shifter 1220.

For each transmitting antenna of the array a required complex QPSK steering vector C is determined 1410 comprising a real component R selected from +1 and −1 and a binary imaginary component I selected from +1 and −1.

The transmitter generates an oscillating signal 1420 which is passed to each antenna via the binary phase shifter. Optionally, each transmitted signal may sweep over a range of frequencies during each time interval.

During a first time interval 1430, for each transmitting antenna having an associated steering vector with a real component R of +1, the associated binary phase shifter applies a 180 degree phase shift to the transmitted signal 1432, the antenna transmits the signal 1434 and the received signal is stored in the memory of the postprocessor 1436.

During a second time interval 1440, for each transmitting antenna having an associated steering vector with an imaginary component I of +1, the associated binary phase shifter applies a 180 degree phase shift to the transmitted signal 1442, the antenna transmits the signal 1444 and the received signal is stored in the memory of the postprocessor 1446.

The post processor may then apply a 90 degree phase shift to signals received 1450 during the second time interval 1440 and sum the signals received during the first time interval to 90 degree phase shifted signals received during the second time interval 1460.

A particular feature of the systems and methods described herein is the linear combination of the received signal over several time intervals in order to simulate and benefit from the advantages of an enhanced beamformer in a simulated manner. This feature can be extended in various forms which will be clear to those skilled in the art and are mentioned here as examples.

In one extension where the transmitter already supports beamforming using a certain choice of phases (e.g. 4 phases QPSK, 8 phases 8-PSK, etc), or gains, the combination of M codewords (two or more) over M time intervals can be used in order to generate a larger choice of phases by factor M (as for example, using 4 time intervals with BPSK or 2 time intervals with QPSK to generate simulated 8-PSK).

The simulated QPSK scheme can be alternatively described by taking a desired phasor C per transmit antenna, transmitting $X=\text{Sgn}(\text{Re}\{C \cdot e^{-j\phi}\})$, where $\phi$ is 0 for the first interval and 90 degrees for the second interval, and then compensating for this phase in the received by multiplying with $e^{j\phi}$. In another extension of the current invention, the sequence of the "modulating" phase $\phi$ can be chosen in different ways over time, for example in different scanned frequencies or frames.

In another extension of the invention, the received signals over the M intervals are combined with arbitrary phasors $a_1, \ldots a_M$ not necessarily having unit gain (instead of $a_1=1$, $a_2=j$ for the case of QPSK as described herein). The beamforming codewords over these M intervals are chosen in a way that their linear combination weighted by $a_1, \ldots a_M$ yields desired characteristics (such as a high peak to sidelobe level).

The method described above for implementing QPSK (4 phases) beamforming by using binary phase shifters and two time-intervals is presented for illustrative purposes only. This method may be further generalized to implement any even number 2n of phases over n time-intervals. For example, with three time-intervals, a 6-PSK modulation may be achieved.

For N time intervals, a method may be implemented in which a transmitter applies a 180 degree phase shift selectively to particular antennas according to the following conditions. In the n-th time interval, a 180 degree phase shift is applied to the k-th antenna if the real value of the steering vector rotated by $-n*180/N$ degrees is negative. Thus, for the k-th antenna a 180 degree phase shift is applied if the following formula is true:

$$\text{Real}(C_k * e^{-j*\phi(n)}) < 0,$$

where $C_k$ is the k-th component of the steering vector, and $\phi_n = \pi n/N$ is the rotation sequence.

Accordingly, where appropriate, in the post-processor, a rotation of $\phi n$ radians maybe applied for the n-th time-interval, before summation of the received signal in all time intervals.

A method such as described herein may be extended to incorporate further criteria for the desired beamformer, by choosing a set of N phase shift sequences such that the mean of the transmitted signal over the N time intervals satisfies the desired criteria. For example, effective attenuation for a specific transmitter antenna may be required for gain control for apodization and transmitter gain equalization. This may be achieved, even without analog gain control, by using a specific rotation sequence for a specific transmit antenna, for example the steering vector for each antenna may be rotated by an angular step $(1-a)*\phi n$, say, where the value of a is selected specifically to suit each transmitter antenna).

The multiple time-intervals, needed for applying the described method, may further be used for other purposes. In one possible embodiment, multiple time-intervals may be used to allow Doppler processing within each Frame, in order to allow for an integration time that may be longer than the channel coherence time as well as for obtaining information regarding the velocity of targets. Each spatial transmitter direction to be scanned may include N time-intervals, and the Doppler post-processing may search for a linear phase shift between intervals that may correspond to a radial velocity. This may be implemented, for example using a Fast Fourier Transformation (FFT) over the time-intervals.

It is noted that, where appropriate, each time-interval may itself include sweeping the transmitted signal over multiple frequencies using a stepped frequency continuous wave, a Chirp or some other frequency function over time for the duration of the time-interval. Accordingly, by changing the beamformer between time-intervals as described above sidelobe levels would typically be reduced due to phase quantization at any given velocity. Nevertheless, the associated beamforming quantization errors may generate sidelobes at other velocities.

It is another feature of the current method that the spectral shape of the sidelobes which are generated may be controlled by selecting a specific order for the time-intervals, such that most of the quantization noise which generates the sidelobes is limited to high frequencies, which correspond to radial velocities higher than those expected in the specific application. Where required, the phase rotation $\phi n$ for the n-th time-interval (where n may take any integer value from 0 to N-1), may be selected such that:

$$\phi_n = \pi * [(n*(N-1)/2) \bmod N],$$

where the "mod" is the modulo operation which returns the remainder of division by a given integer and it is assumed that N is an integer multiple of 4. As above, the 180 degrees rotation may be applied in the transmitter only if Real $(C_k * e^{-j*\phi[n]}) < 0$, and the post-processor applies a rotation by $\phi n$. With such a reordering of the time-intervals, most of the sidelobes power resides at the Nyquist frequency of the Doppler.

It will be appreciated that other constructions may be used for selecting the order in the phase rotation sequence, or the sequence of steering vectors, so as to optimize the spectral shape of the quantization noise, as suit requirements.

In the construction above, a known required steering vector is rotated by $\phi_n$ for the binary phase selection. An alternative approach, for example where the required steering vector is not known, may involve searching for the phase selection at the transmitter for which the value of Real(H $(\{b_k\})*\exp(j*\phi_n))$ is maximal, where H($\{b_k\}$) is the phasor representing the combination of all transmitting antennas in the desired spatial direction with a specific phase selection $b_k$. Such maximization can be performed in various ways for example by exhaustive search over all binary phase combinations (with K transmit antennas there are $2^K$ options). H may be obtained, for example, by analysis of direct measurements of electromagnetic waves reflected by a reference target located in a desired spatial direction.

The number of time-intervals may be selected so as to achieve the required beamforming accuracy in terms of, for example, sidelobes level, signal to noise ratio (SNR) (possibly using a longer integration time by adding intervals) and Doppler estimation resolution. On the other hand, the number of time intervals may be limited by other factors such as memory capacity and processing power of the electronic components, and avoidance of blur in the Frame. Accordingly, the actual number of time-intervals selected may be a compromise of all these considerations.

As some spatial directions might be more important than others, in terms of the needed SNR and Doppler resolution, it may be preferred that more time-intervals are allocated to those preferred directions, and fewer to other lower priority directions.

This scanning scheme may be used in various applications such as an exterior car radar sensor, used for ADAS (Advanced Driver Assistance System) or autonomous driving. In such an application, it will be appreciated that the horizontal angular range of interest (azimuth range) is typically wider than the vertical angular range of interest, (elevation range). This is because the car radar sensor is not generally required to scan beneath the road surface. Accordingly, it may be preferred to align the transmitter antennas in a vertical linear array such that the side lobes lie outside the high priority elevation range. The receiver antennas may be arranged in an orthogonally orientated horizontal linear array.

Other possible applications may include the monitoring of an enclosed space such as a room, a playing field, a goal-line or the like. Still other applications may involve the tracking of objects within a target region, possibly using large-arrays for body-scanning. Still other applications will occur to those skilled in the art.

Figure 8B:
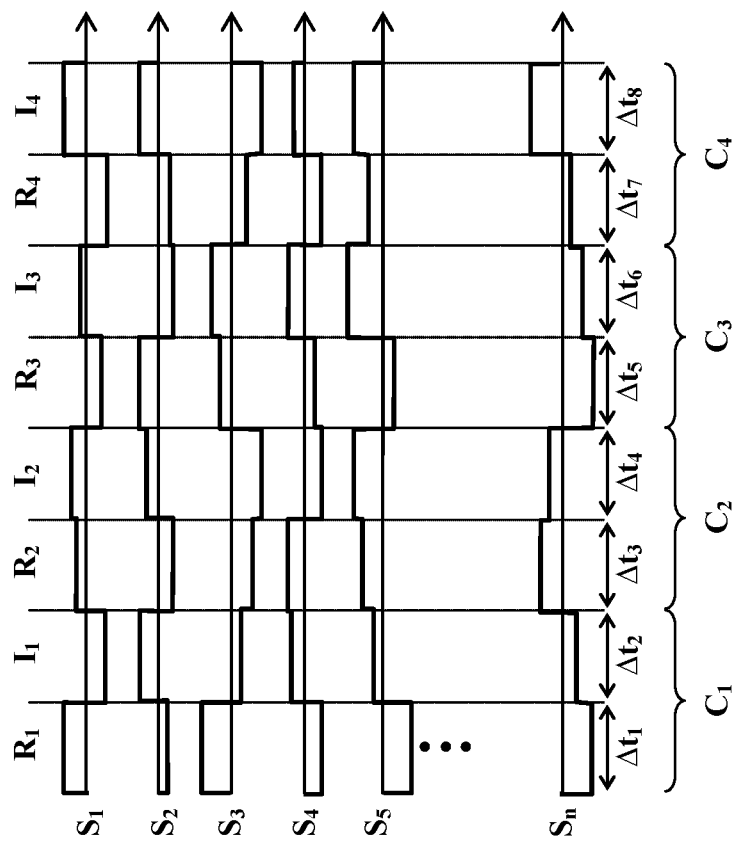
FIG. 8B are a set of graphs indicating a possible set of profiles showing an example of how the phase of the transmitted signal from each transmitter antenna of the second embodiment may change over time.
Figure 8A:
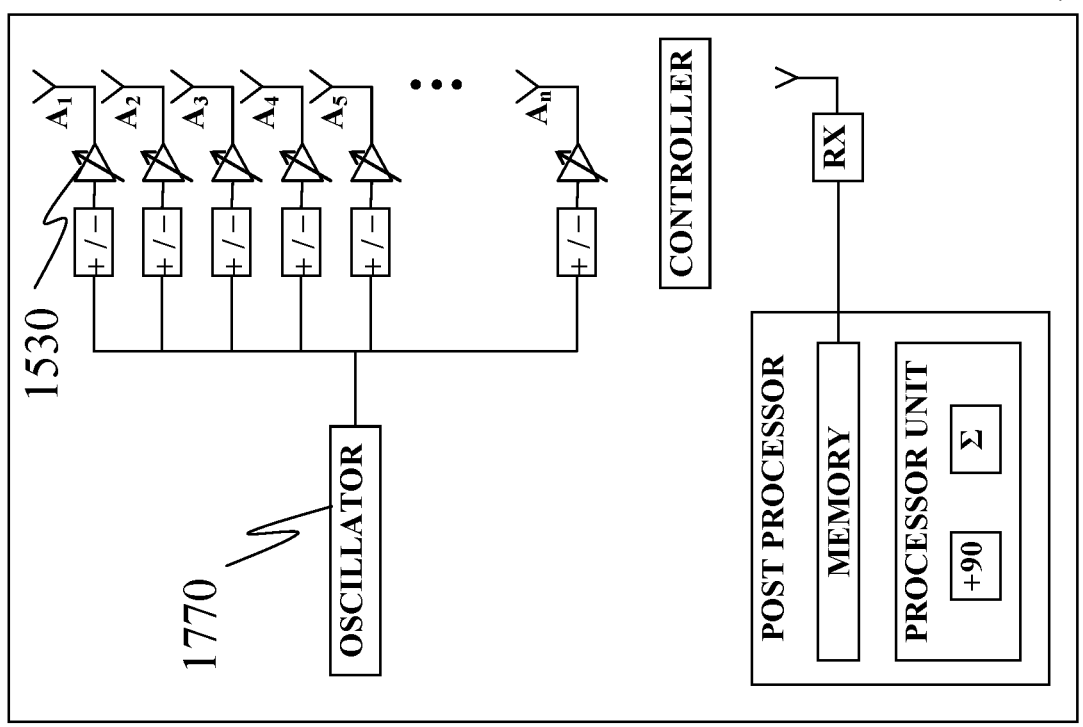
FIG. 8A is a block diagram schematically representing selected elements of a second embodiment of a system for simulating quadrature phase-shift keying (QPSK) beam forming in which each antenna is connected to gain control unit.

Referring now to the block diagram of FIG. 8A, which schematically represents selected elements of a second embodiment of a system in which each antenna is connected to gain control unit 1550 such that quadrature amplitude modulation (QAM) beam forming may be simulated.

In addition to the components shown in the first embodiment system of FIG. 7A, a dedicated gain control unit 1530 is associated with each transmitting antenna. Accordingly, the controller is further configured to instructions to the gain control units to amplify the transmitted signal by a required gain determined by the complex steering vector.

The controller may again be operable to determine a required complex steering vector C=R+jI for each antenna of the array. Here, however, the steering vectors may have a continuous real component R selected from the range +1>R>−1 and a continuous imaginary component I selected from the range +1>I>−1.

Accordingly, the controller may be further operable to select a required amplitude R for the real component of the associated steering vector and during the first time interval instruct the associated gain control unit to apply an associated first gain GR to the transmitted signal. Similarly the controller is operable to select a required amplitude I for the imaginary component of the associated steering vector and during the second time interval instruct the associated gain control unit to apply a second gain GI to the transmitted signal wherein the second gain GI is equal to the product of GR and the absolute ratio of I to R.

Referring to the set of graphs shown in FIG. 8B, the resulting signals produced by each antenna during each time period may thus be amplitude modulated as well as phase modulated.

Figure 8C:
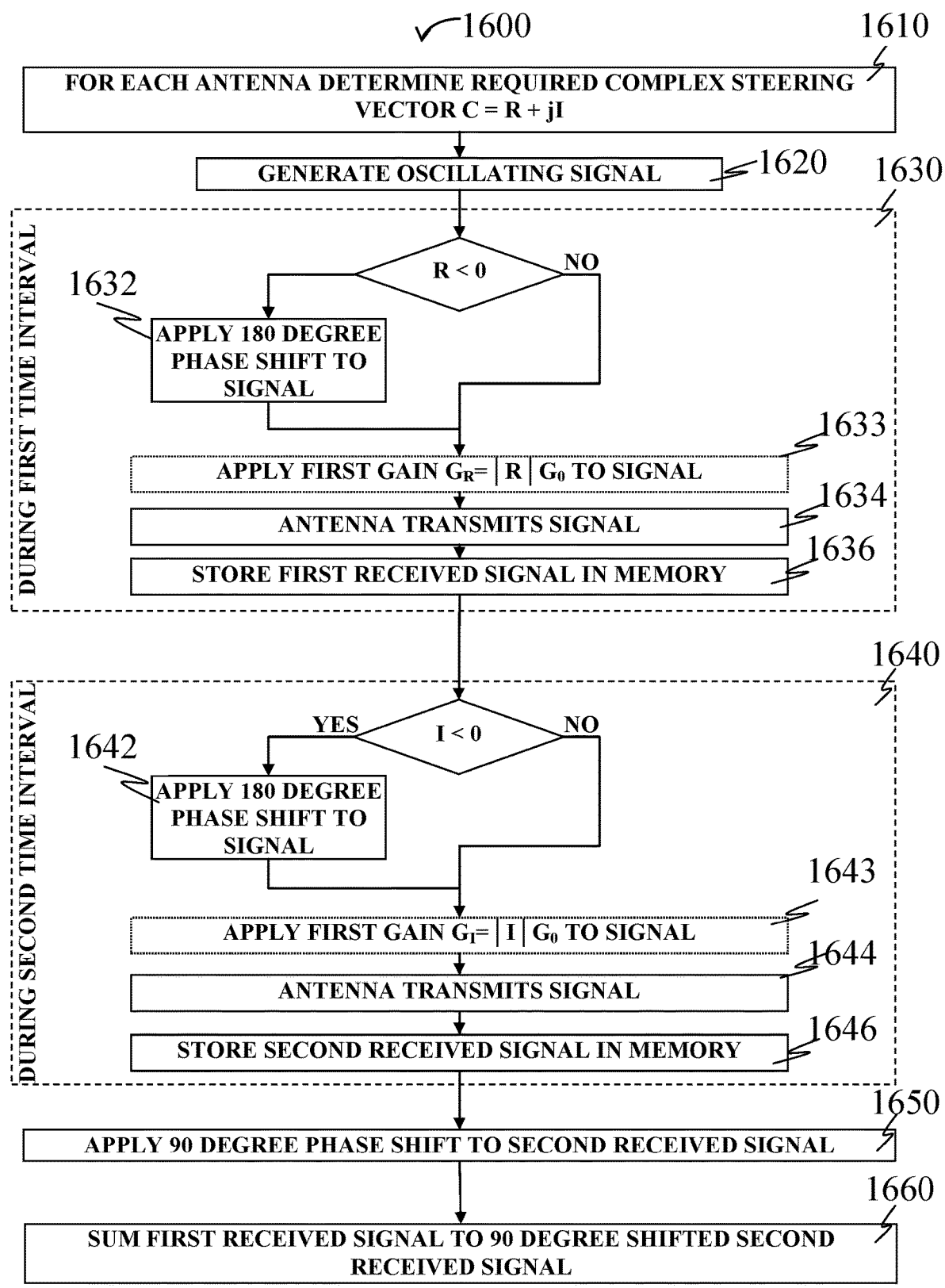
FIG. 8C is a flowchart indicating selected steps in a method for simulating quadrature phase-shift keying (QPSK) beam forming with the system of the second embodiment.

Referring now to the flowchart of FIG. 8C, selected steps are indicated of a method for simulating quadrature amplitude modulation (QAM) beam forming with the system of FIG. 8A in which the antennas of the array are each connected to a common transmitter via an associated binary phase shifter and a gain control unit 1530.

For each transmitting antenna of the array a required complex QPSK steering vector C is determined 1610 comprising a real component R selected from the range +1>R>−1 and an imaginary component I selected from the range +1>I>−1.

The transmitter generates an oscillating signal 1620 which is passed to each antenna via the binary phase shifter. Optionally, each transmitted signal may sweep over a range of frequencies during each time interval.

During a first time interval 1630, for each transmitting antenna having an associated steering vector with a negative real component R, the associated binary phase shifter applies a 180 degree phase shift to the transmitted signal 1632. The associated gain control unit amplifies the signal by a first value GR=|R|G0 1633, the antenna transmits the amplified signal 1634 and the received signal is stored in the memory of the postprocessor 1636.

During a second time interval 1640, for each transmitting antenna having an associated steering vector with a negative imaginary component I, the associated binary phase shifter applies a 180 degree phase shift to the transmitted signal 1642. The associated gain control unit amplifies the signal by a second value GI=|I|G0 1643 Then the antenna transmits the amplified signal 1644 and the received signal is again stored in the memory of the post-processor 1646.

Accordingly, when the post processor may applies a 90 degree phase shift 1650 to signals received during the second time 1640 interval and sums these signals 1660 with the signals received during the first time interval, the resultant signal may have a virtual phase shift of any value required.

Figure 9B:
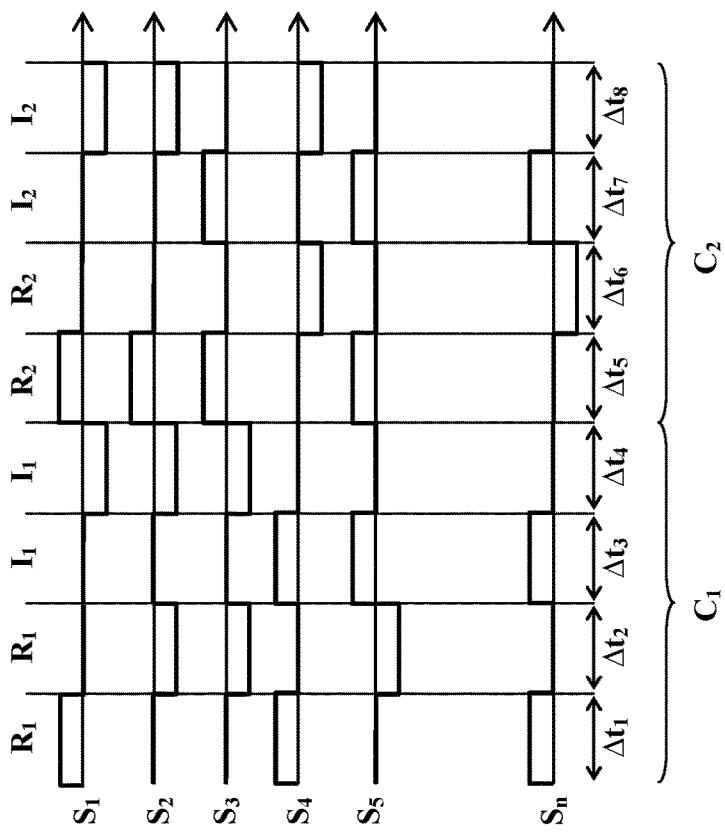
FIG. 9B are set of graphs indicating a possible set of profiles showing an example of how the phase of the transmitted signal from each transmitter antenna of the third embodiment may change over time.
Figure 9A:
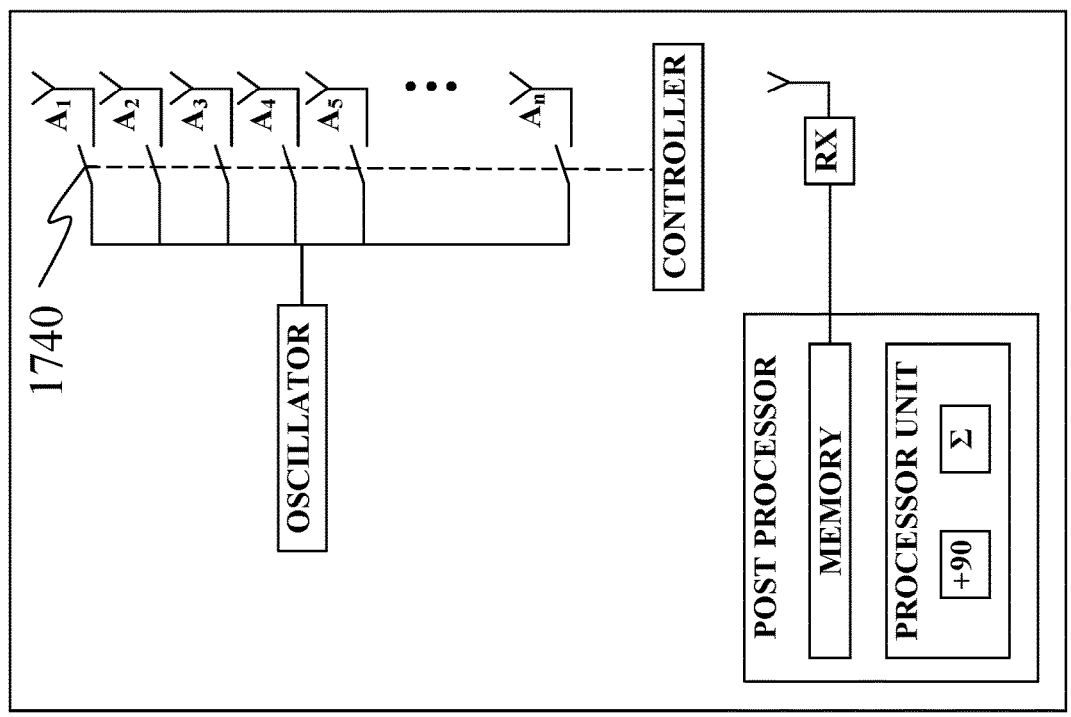
FIG. 9A is block diagram of a system including a common binary phase shifted shared by all antennas according to a third embodiment.

It is further noted that although systems described herein include a dedicated binary phase shifter for each antenna, alternative systems may operate without phase shifters, by utilizing additional time intervals, as illustrated in FIG. 9A.

Using such a system may be enabled by activating only those antennas having a real component of +1 for a first time period without a phase shift, activating only those antennas having a real component of −1 for a second time period where a phase shift of 180 degrees is applied at the receiver, activating only those antennas having an imaginary component of +1 for a third time period without a phase shift, activating only those antennas having an imaginary component of −1 for a fourth time period and applying a phase shift of 180 degrees at the receiver.

It is further noted that provided that each antenna of a system has an independently controllable connecting switch 1740, such as illustrated in FIG. 9A, it may be possible to apply such phase shifts directly from the oscillator 1770 or during post processing. Additionally or alternatively, a common binary phase shifter may be connected to multiple transmitting antennas as required.

An example of the signal profiles produced by an example of such a system are presented in FIG. 4B. The post processor may store received signals from each of the first time period, the second time period, the third time period and the fourth time period in the memory.

The four signals may be summed by the receiver after applying a 0, 180, 90, 270 degree phase shift to the first, second, third and fourth step, respectively. By summing all these signals a simulated QPSK steering vector may be achieved in a system without phase shifters.

Still further extensions of the linear combination of a received signal over multiple time intervals will occur to those skilled in the art.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 7 to 4, from 7 to 6, from 3 to 6 etc., as well as individual numbers within that range, for example, 1, 7, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A system for sensing the surroundings of a vehicle comprising:
   a vehicle mounted radar unit comprising:
      a radar transmission unit comprising an array of transmitter antennas connected to an oscillator and configured to transmit electromagnetic waves into a region surrounding the vehicle, and
      a radar receiving unit comprising at least one receiver antenna configured to receive electromagnetic waves reflected by objects within the region surrounding the vehicle and operable to generate raw data;
   a processor unit in communication with the radar receiving unit and configured to receive raw data from the radar unit and operable to generate environmental information based upon the received data;
   wherein the processor comprises at least one module selected from:
      a self-velocity calculation module operable to calculate velocity of the vehicle from raw data;
      a wall detection module operable to detect planar surfaces in the region surrounding the vehicle;
      a dynamic-range enhancement module operable to distinguish objects reflecting weakly from objects reflecting strongly within the same vicinity; and
      a double-reflection identification module operable to distinguish single-reflected electromagnetic waves reflected directly by objects towards the radar receiving unit from double-reflected electromagnetic waves reflected indirectly from objects towards the radar receiving unit via intermediate reflective surfaces;

wherein the self-velocity calculation module comprises an image generation unit, a memory unit,
wherein the image generation unit configured and operable to construct a constructing a three dimensional image representing the region surrounding the vehicle comprising a matrix of voxels, each voxel characterized by a set of voxel parameters including:
a horizontal spatial coordinate, x, of a reflecting object along an axis parallel to the path of the vehicle;
a vertical spatial coordinate, y, of the reflecting object along a vertical axis orthogonal to the path of the vehicle;
a radial spatial coordinate, R, of the reflecting object along an axis diverging radially from the vehicle;
an intensity value; and
a Doppler-shift value indicating an apparent radial velocity vR of the reflecting object; and
wherein the memory unit configured to store data pertaining to at least:
a first three dimensional image representing the region surrounding the vehicle at a first instant, and
a second three dimensional image representing the region surrounding the vehicle at a second instant after a delay time, and
wherein the self-velocity calculation module is further operable to determine a horizontal shift, dx, for detected reflecting objects; and to calculate a gradient of a plot of apparent radial velocity vR as a function of horizontal shift dx for the reflecting objects.

2. A method for determining the velocity of a vehicle moving along a path, the method comprising:
providing a vehicle mounted radar unit;
transmitting electromagnetic radiation into the region surrounding the vehicle;
receiving electromagnetic radiation reflected from objects in the region surrounding the vehicle;
constructing a first three dimensional image representing the region surrounding the vehicle at a first instant;
after a delay time, dt, constructing a second three dimensional image representing the region surrounding the vehicle at a second instant;
detecting common reflecting objects in the first three dimensional image and the second three dimensional image;
determining a horizontal shift, dx, for detected reflecting object; and
calculating a gradient of a plot of apparent radial velocity vR as a function of horizontal shift dx for the reflecting objects.

3. The method of claim 2 wherein the apparent radial velocity vR is determined from a Doppler shift of radiation reflected from the reflecting object.

4. The method of claim 2 wherein each three dimensional image comprises a matrix of voxels, each voxel characterized by a first set of voxel parameters including:
a horizontal spatial coordinate, x, of a reflecting object along an axis parallel to the path of the vehicle;
a vertical spatial coordinate, y, of the reflecting object along a vertical axis orthogonal to the path of the vehicle;
a radial spatial coordinate, R, of the reflecting object along an axis diverging radially from the vehicle;
an intensity value; and
a Doppler-shift value indicating the apparent radial velocity vR of the reflecting object.

5. The method of claim 2 wherein the step of determining the horizontal shift, dx, comprises:
determining an x-coordinate, xn, for the reflecting object;
determining a y-coordinate, yn, for the reflecting object;
finding the reflecting object's co-altitude angle, θn, by calculating the arctangent of the ratio (xn/yn) of the x-coordinate of the reflecting object and the y-coordinate of the reflecting object an angle;
calculating the sine of the co-altitude angel such that dx=sin(arctan(xn/yn)).

6. The method of claim 2 wherein the step of transmitting electromagnetic radiation into the region surrounding the vehicle comprises simulating quadrature phase-shift key (QPSK) beam forming by:
for each transmitting antenna of the array determining a required complex QPSK steering vector comprising a real component selected from 0 and 180 degrees and an imaginary component selected from 90 and 270 degrees;
the radar transmission unit generating an oscillating signal;
during a first time interval, for each transmitting antenna having an associated steering vector with a real component of 180 degrees, said binary phase shifter applying a 180 degree phase shift to the transmitted signal; and
during a second time interval, for each transmitting antenna having an associated steering vector with an imaginary component of 180 degrees, said binary phase shifter applying a 180 degree phase shift to the transmitted signal; and
wherein the step of receiving electromagnetic radiation reflected from an object in the region surrounding the vehicle comprises:
a post processor applying a 90 degree phase shift to signals received during the second time interval; and
the post processor summing the signals received during the first time interval to 90 degree phase shifted signals received during the second time interval.

7. The method of claim 2 further comprising for each transmitting antenna:
selecting a required amplitude AR for the real component of the associated steering vector;
during the first time interval applying a first gain GR to the transmitted signal;
selecting a required amplitude AI for the imaginary component of the associated steering vector; and
during the second time interval applying a second gain GI to the transmitted signal wherein the second gain GI is equal to the product of GR and the ratio of AI to AR.

8. A method for determining the velocity of a vehicle moving along a path, the method comprising:
providing a vehicle mounted radar unit;
transmitting electromagnetic radiation into the region surrounding the vehicle;
receiving electromagnetic radiation reflected from objects in the region surrounding the vehicle;
constructing a first three dimensional image representing the region surrounding the vehicle at a first instant, the three dimensional image comprising a matrix of voxels, each voxel characterized by a first set of voxel parameters including:
a horizontal spatial coordinate, x, of a reflecting object along an axis parallel to the path of the vehicle;
a vertical spatial coordinate, y, of the reflecting object along a vertical axis orthogonal to the path of the vehicle;

a radial spatial coordinate, R, of the reflecting object along an axis diverging radially from the vehicle;

an intensity value; and a Doppler-shift value indicating an apparent radial velocity vR of the reflecting object;

after a delay time, dt, constructing a second three dimensional image representing the region surrounding the vehicle at a second instant, the three dimensional image comprising a matrix of voxels, each voxel characterized by a second set of voxel parameters;

detecting common reflecting objects in the first set of voxel parameters and the second set of voxel parameters;

determining a horizontal shift, dx, for detected reflecting object; and calculating a gradient of a plot of apparent radial velocity vR as a function of horizontal shift dx for the reflecting objects.

* * * * *